United States Patent
Brajovic

(12) 
(10) Patent No.: US 12,409,952 B1
(45) Date of Patent: Sep. 9, 2025

(54) VEHICLES, SYSTEMS, AND METHODS FOR THE AUTONOMOUS INSPECTION OF OBJECTS

(71) Applicant: Near Earth Autonomy, Inc., Pittsburgh, PA (US)

(72) Inventor: Vladimir Brajovic, Pittsburgh, PA (US)

(73) Assignee: Near Earth Autonomy, Inc., Pittsburgh, PA (US)

(*) Notice: Subject to any disclaimer, the term of this patent is extended or adjusted under 35 U.S.C. 154(b) by 552 days.

(21) Appl. No.: 18/076,666

(22) Filed: Dec. 7, 2022

Related U.S. Application Data

(60) Provisional application No. 63/287,598, filed on Dec. 9, 2021.

(51) Int. Cl.
| | |
|---|---|
| *B64F 5/60* | (2017.01) |
| *G01S 17/89* | (2020.01) |
| *G06T 7/00* | (2017.01) |
| *G06T 7/38* | (2017.01) |
| *G06V 20/17* | (2022.01) |

(Continued)

(52) U.S. Cl.
CPC ............... *B64F 5/60* (2017.01); *G01S 17/89* (2013.01); *G06T 7/0004* (2013.01); *G06T 7/38* (2017.01); *G06V 20/17* (2022.01); *B64U 2101/26* (2023.01); *B64U 2101/30* (2023.01); *B64U 2201/10* (2023.01); *G06T 2207/10028* (2013.01); *G06T 2207/10032* (2013.01); *G06T 2207/20081* (2013.01)

(58) Field of Classification Search
CPC .......... B64F 5/60; B64C 39/024; G01S 17/89; G06F 30/15; G06T 7/0004; G06T 7/38; G06T 2207/10028; G06T 2207/10032; G06T 2207/20081; G06V 20/17; H04W 4/40; B64U 2101/26; B64U 2101/30; B64U 2201/10
See application file for complete search history.

(56) References Cited

U.S. PATENT DOCUMENTS

| | | |
|---|---|---|
| 9,609,288 B1 | 3/2017 | Richman et al. |
| 10,176,527 B1 | 1/2019 | Freeman et al. |
| 10,377,485 B2 | 8/2019 | Claybrough |

(Continued)

FOREIGN PATENT DOCUMENTS

| | | | | |
|---|---|---|---|---|
| GB | 2590468 A | * | 6/2021 | ......... G01N 21/8851 |
| WO | 2017153912 A1 | | 9/2017 | |

*Primary Examiner* — Michael P LaPage
(74) *Attorney, Agent, or Firm* — K&L Gates LLP

(57) ABSTRACT

A vehicle autonomously inspects an object within an environment. The vehicle includes an inspection sensor, a localization sensor, and a computing system. The localization sensor can detect three-dimensional surfaces within the environment. The inspection sensor can characterize the object. The computing system includes a memory configured to store a three-dimensional model of the object and predetermined inspection instructions. The computing system further includes a processor configured to register the model of the object within the environment based on information gathered by the localization sensor on an initial journey of the vehicle. The processor can also adjust the predetermined inspection instructions based on the information gathered by the localization sensor on an initial journey of the vehicle.

23 Claims, 8 Drawing Sheets

(51) Int. Cl.
*B64U 101/26* (2023.01)
*B64U 101/30* (2023.01)

(56) References Cited

U.S. PATENT DOCUMENTS

| | | |
|---|---|---|
| 10,597,054 B2 | 3/2020 | Arndt et al. |
| 10,679,172 B2 | 6/2020 | Burch, V et al. |
| 11,334,953 B1 | 5/2022 | Tofte et al. |
| 2019/0064362 A1 | 2/2019 | Scott |
| 2019/0185186 A1 | 6/2019 | Li |
| 2019/0206044 A1* | 7/2019 | Marra .................. H04N 13/204 |
| 2019/0266715 A1 | 8/2019 | Myers et al. |
| 2020/0074730 A1 | 3/2020 | Shloosh et al. |
| 2020/0184706 A1* | 6/2020 | Speasl .................. H04L 9/0643 |
| 2020/0401138 A1 | 12/2020 | Rentz et al. |
| 2021/0041877 A1 | 2/2021 | Lacaze et al. |
| 2021/0126582 A1* | 4/2021 | Shue ...................... H02S 50/15 |
| 2022/0172343 A1* | 6/2022 | Lefebvre Albaret ..... B64F 5/60 |
| 2022/0373473 A1* | 11/2022 | Steffan ............... G01N 21/8851 |
| 2023/0375334 A1* | 11/2023 | Kang ..................... G01B 11/25 |
| 2025/0014161 A1* | 1/2025 | Rakha .................. G06V 20/176 |

\* cited by examiner

VEHICLES, SYSTEMS, AND METHODS FOR THE AUTONOMOUS INSPECTION OF OBJECTS

PRIORITY CLAIM

The present application claims priority to U.S. provisional patent application Ser. No. 63/287,598, filed Dec. 9, 2021, which is incorporated herein by reference in its entirety.

BACKGROUND

Large objects, such as airplanes and architectural structures (e.g., building and bridges) often need inspection. Drones equipped with cameras or other inspection devices and sensors are an emerging way of inspecting such large objects because of their relatively low cost and maneuverability.

SUMMARY

In one general aspect, the present disclosure is directed to an improved method for autonomously inspecting an object, such as an aircraft, a bridge, a building etc. with the autonomous inspection vehicle, such as a drone or unmanned aerial vehicle (UAV). The inspection vehicle includes a localization subsystem, one or more inspection sensors, and a computing system. Optionally the UAV inspection system includes a communication means and a ground station for interaction with a user or for off-board computing. The inspection sensor may include 3D mapping sensor to collect a 3D map (e.g., point cloud) of the object to be inspected relative to a fixed coordinate system. The inspection sensor(s) can characterize the object; i.e., perform the inspection. The computing system includes a memory configured to store a three-dimensional model of the object (e.g., a CAD model) and predetermined inspection instructions. The computing system further includes a processor configured to register the 3D model of the object to the 3D map of the object generated from the 3D mapping sensor. For example, the inspection vehicle can make an initial journey (or the first phase of a single journey) around the object to generate the 3D point cloud of the object. Then the processor can register the 3D CAD model to the 3D point cloud to establish a correspondence of the location of features in the 3D CAD model to the coordinates in the 3D point cloud. The processor can then control the aircraft, in a second journey (or second phase of a single journey) around the object being inspected to perform the inspection in accordance with the inspection instructions and travel path. That is, for example, the aircraft can fly to specific locations required by the inspection instructions to inspect specific features of the object in the 3D model. The inspection system can comprise, for example, a camera, a radar sensor, and/or a thermal imager.

These and other benefits that are realized aspects of the present disclosure will be apparent from the description that follows.

FIGURES

Various aspects of the present disclosure are described herein by way of example in connection with the following figures, wherein.

DESCRIPTION

The present disclosure is directed, in various aspects, to devices, systems, and methods associated with autonomous vehicles configured to inspect objects. It shall be appreciated that the non-limiting aspects disclosed herein are exclusively presented for illustrative purposes. For example, according to some non-limiting aspects, the vehicle used for inspection can be an unmanned aerial vehicle (UAV) or a drone. However, the present disclosure is not necessarily so limited and other types of inspection vehicles could be used. In that connection, the inspection vehicle may be any suitable type of mobile ground or aerial vehicle, such as, as non-limiting examples, a ground-based mobile robot, a rotor or fixed-wing aircraft, such as a drone, unmanned aerial vehicle, etc. As such, the inspection vehicle can include steering and propulsion systems. For example, the steering/propulsion system for a gas-powered ground vehicle may include a gas-powered engine and the drivetrain. The steering/propulsion system for an electric vehicle may include a battery, an electric motor and the drivetrain. The steering/propulsion system for a rotorcraft (e.g., a drone or other type rotorcraft) can include the rotorcraft's motor-powered rotor(s). The steering/propulsion system for a fixed-wing aircraft can include the engine(s) along with ailerons, elevators, rudders, spoilers, and/or air brakes for steering, for example.

Additionally, the term "autonomous" shall not be limited to unmanned vehicles. For example, a vehicle can be autonomous and still accommodate a human passenger. As used herein, the term "object" when referring to the object being inspected shall also be broadly construed. Although the present disclosure describes non-limiting aspects wherein an autonomous vehicle is configured to inspect an aircraft or an airliner, it shall be appreciated that the vehicles, systems and methods disclosed herein can be similarly implemented to autonomously inspect other types of objects, such as a watercraft or an architectural structure, such as a bridge or building. Accordingly, the term present disclosure contemplates numerous aspects including various vehicles configured to travel substantially without human intervention in at least one mode of operation, and to inspect various objects.

Figure 1:
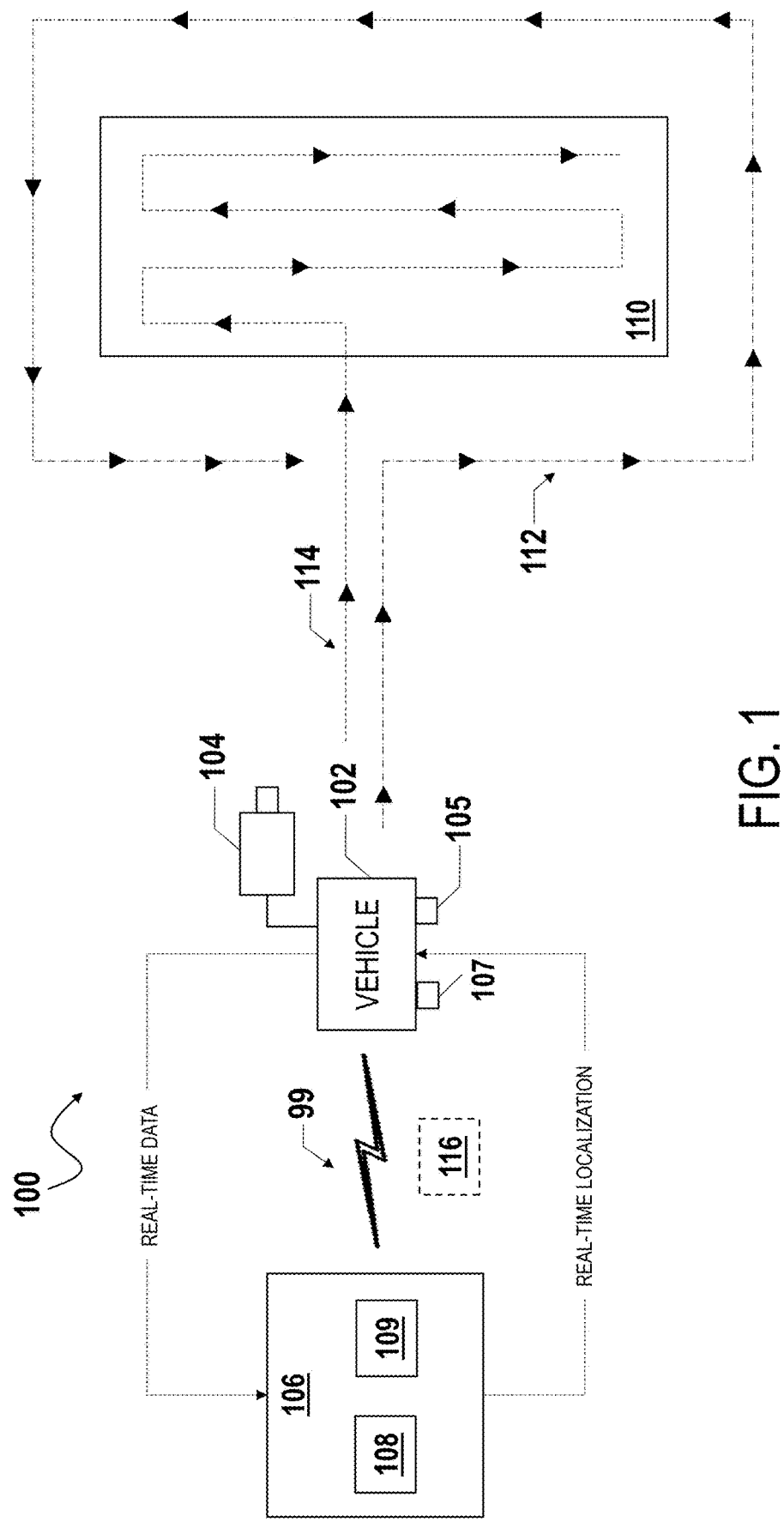
FIG. 1 illustrates a system configured for the autonomous inspection of an object in accordance with at least one non-limiting aspect of the present disclosure.

Referring now to FIG. 1, a system 100 including a vehicle 102 configured to autonomously navigate and inspect an object 110 is depicted in accordance with at least one non-limiting aspect of the present disclosure. According to the non-limiting aspect of FIG. 1, the system 100 can include a vehicle 102 that includes one or more inspection sensors 104 for inspecting the object 110. The inspection sensor 104 can be selected for a specific type of inspection according to user preference and/or intended application. For example, according to the non-limiting aspect of FIG. 1, the inspection sensor 104 can include a camera configured for a visual inspection of the object 110 and can generate image data (e.g., pictures, videos). The data can be transmitted and processed to characterize the object 110 being inspected. However, it shall be appreciated that the sensor 104 can include any other device suitable for the desired inspection. For example, according to other non-limiting aspects of the present disclosure, the sensor 104 can be configured for radar, sonar, thermal, contact sensing modality, and/or any combination thereof to perform object inspection.

In further reference to FIG. 1, the vehicle 102 can also include a 3D mapping sensor 105 configured to detect three-dimensional shapes within the environment in which the vehicle 102 moves. For example, according to the non-limiting aspect of FIG. 1, the 3D mapping sensor 105 can include a lidar or laser scanner configured to use light in the form of a pulsed laser to measure ranges and/or variable distances between the vehicle 102 and objects within the environment. As such, when the vehicle 102 moves in the environment around the object 110, the data from the 3D mapping sensor 105 of FIG. 1 can be used to generate a 3D map of the object 110 relative to a coordinate system, e.g., a global coordinate system.

The vehicle 102 includes a localization subsystem 107. The localization subsystem 107 estimates the position and attitude of the vehicle 102 in the working environment. The localization subsystem uses one or more localization sensors (not shown), such as an inertial measurement unit (IIU), cameras, laser range finders, and/or GPS system. These sensors in combination with signal processing algorithms estimate and track the position and attitude of the vehicle 102 as it moves around the environment. One reference describing and teaching various state-of-the-art localization subsystems for autonomous systems is "Survey on Localization Systems and Algorithms for Unmanned Systems" authored by Shenghai Yuan, Han Wang, and Lihua Xie, published in "Unmanned Systems" Journal, Vol. 9, Number 2, pages 129-163, year 2021, doi:10.1142/S230138502150014X, which is incorporated herein by reference. The knowledge of the vehicle position and attitude afforded by the localization subsystem can be used to reassemble the 3D points detected by the 3D mapping sensor 105 into a coherent 3D point cloud represented in a fixed coordinate system.

The vehicle 102 may also include additional sensors for navigation and obstacle detection and avoidance. In various aspects, output from the inspection sensor(s) 104 could also be used, at various times, for navigation, obstacle detection, and even localization.

Still referring to FIG. 1, the system typically includes a computing system 106. The computing system 106 could be on-board the vehicle 102 or distributed across both an on-board computing device and a remote, off-board computer system. Whether on-board or distributed on/off-board, the computing system 106 is communicably coupled to the inspection sensor 104 and the 3D mapping sensor 105, and the localization subsystem 107 via a data link 99. As used herein, the data link 99 shall include any configuration in which signals can be transmitted between the inspection sensor 104 the computing system 106 or the 3D mapping sensor 105 and the computing system 106. The data link 99 can include any conventional means of wired and/or wireless communication—both infrastructure and ad hoc. Accordingly, the computing system 106 can be communicably coupled to the inspection sensor 104 and the 3D mapping sensor 105 via a number of different connections, including, but not limited to a local area network (LAN), a coaxial cable, a radiofrequency (RF) transmission, an infrared transmission, WiFi©, Bluetooth©, near-field communication (NFC), and/or a cellular connection, amongst others. It shall be appreciated that the data link 99 can include any intermediate systems, subsystems, and/or components positioned between the inspection sensor 104, the localization sensor 105, and the computing system 106.

In further reference to FIG. 1, the computing system 106 can include a processor 108 configured to receive and process signals received from the localization subsystem, the inspection sensor 104 and the 3D mapping sensor 105, as well as a memory 109 configured to store a predetermined (or pre-established), 3D model of the object 110 (e.g., computer-aided design (CAD) model) to be inspected and predetermined inspection instructions. As such, the vehicle 102 can transmit data from the inspection sensor 104 and the 3D mapping sensor 105 in real-time to the computing system 106. The processor 106 can: (1) generate a 3D map (e.g., a point cloud) in a coordinate system of the object 110 from the data output by the vehicle's 3D mapping sensor 105; (2) marry or align the 3D CAD model of the object 110 to the 3D map; and then (3) control the vehicle to perform the inspection based on the inspection instructions and the knowledge of where the features of the object in the 3D CAD model are from the alignment of step (2). The generation of the 3D map (e.g., step (1) above) and be accomplished with a first journey (or first set of journeys) by the vehicle 102 around the object 110, with the inspection (step (3)) being performed in a second, subsequent journey (or set of journeys) by the vehicle 102. In other aspects, all three steps could be performed in one journey: in an initial phase of the journey captures the 3D point cloud data for the object 110; then aligns the 3D map of the object to a predetermined (e.g., CAD) model of the object that is stored in the memory 109; and then controls the vehicle 102 to perform the inspection in accordance with the applicable inspection instructions (also stored in the memory) and based on the registration (i.e., alignment) of the predetermined 3D model of the object to the 3D map of the object (which is in a (e.g., global) coordinate frame). Because the map is known in a global coordinate frame, after the registration the predetermined 3D model of the object is localized and known within the same global frame.

As described herein, the system 100 of FIG. 1 can generate the 3D map of the object prior to the inspection. For example, the vehicle 102 of FIG. 1 can be configured to traverse an initial route 112 about the object 110 and, as the vehicle 102 traverses the initial route 112, the 3D mapping sensor 105 can acquire, for example, 3D point cloud data to generate the 3D map which captures the shape the object 110 in the environment as a 3D point cloud. In a sense, traversing the initial route 112 can be exploratory to generate the 3D map of the object 110. The initial route 112 is depicted in FIG. 1 as being in one horizontal plane relative to the object 110, but in other aspects the initial route 112 can include movement in all three directions (x, y and z) relative to the object 110 to collect the necessary point cloud data to generate a sufficient 3D map to carry out the inspection. The processor 108 can generate the 3D map from the point cloud output from the 3D mapping sensor 105.

In further reference to FIG. 1, upon generating the 3D map, the processor 108 can register the CAD model of the object 110 stored in memory 109 with the coordinate-based 3D map in order to, therefore, register the features in the CAD model with the 3D point cloud of object 110. For example, the processor 108 can register the CAD model to the 3D map by mapping distinctive geometric features of the CAD model of the object (e.g., wings of an aircraft) to corresponding geometric features of the 3D map. An algorithm, such as the iterative closest point (ICP) algorithm, can be used to minimize the errors between the alignments of the various features of the CAD model to the 3D map to ascertain alignment of the 3D model to the 3D map.

Figure 5:
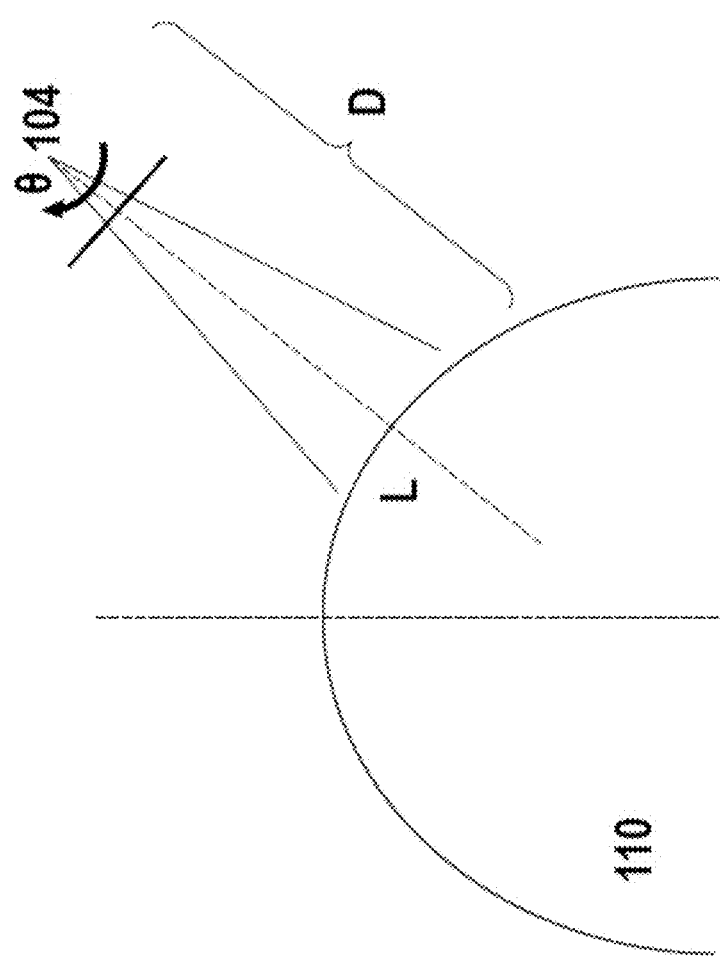
FIG. 5 illustrates the positioning of an inspection system of the vehicle of FIG. 2 relative to an object to be inspected in accordance with at least one non-limiting aspect of the present disclosure.

Still referring to FIG. 1, the memory 109 can be further configured to store instructions associated with a desired inspection of the object 110. The memory 109 can be configured to store a predetermined inspection route 114 about the object 110. The inspection route 114 can include instructions to capture images of certain features of the object 110 in the 3D (CAD) model from certain directions. For example, FIG. 5 depicts an a non-limiting aspect wherein the object 110 is an aircraft fuselage to be inspected and the inspection route 114 instructs the vehicle 102 to capture an image of a specific location L on the fuselage from a predetermined distance D (as a non-limiting example, 1.3 to 2.3 m) at a predetermined angle θ relative to the aircraft. The specific location L on the aircraft 110 can be specified relative to the 3D CAD model of the aircraft 110. After the alignment of the 3D CAD model to the 3D point cloud of the object 110 and the surrounding scene (i.e., the scene around the object), the location L becomes relative to the 3D map of the real location of the object 110 in the environment. The processor 108 can be configured to determine: (i) the 3D coordinates of the features of the object that need to be imaged from the alignment of the 3D model to the 3D map, (ii) the real-time, continuously-updated position and orientation (also known as "pose") of the vehicle during the inspection journey, and (iii) the orientation of the camera's field of view relative to the vehicle's pose. The processor 108 can control the operation and movement of the vehicle 102 based, at least in part, on the determined information, such that the vehicle 102 travels to the specific location L, from the predetermined distance D from the object 110, and orients itself at the predetermined angle θ, such that the inspection system 104 is appropriately oriented according to inspection instructions. Accordingly, the vehicle 102 can capture a desired image of the object 110 for inspection.

The inspection system (e.g. camera) 104 can be fixedly positioned on the vehicle, such that the orientation of the camera relative to the vehicle is constant. In other aspects, the inspection system 104 can be movable in one or more directions, and the processor 108 can continually track a direction of the inspection system 104 relative to the vehicle 102. The vehicle 102 can include other on-board detection and avoidance systems which it can use to navigate around other objects as it traverses the initial journey to generate the 3D map and performs and inspection of the primary object 110.

As the vehicle 102 traverses the inspection route 114, the inspection sensor 104 can collect and transmit data associated with a condition of the object 110 to the processor 108. The processor 108 can be further configured to detect defects in the object 110 based, at least in part, on the data collected by the inspection system 104. For example, according to some non-limiting aspects, the processor 108 can detect defects in the object 110 based, at least in part, on a comparison of an image captured by the inspection sensor 104 to an image of the object 110 stored in the memory 109. According to other non-limiting aspects, the processor 108 can implement a machine learning algorithm, such as a deep neural network, that is trained to detect defects in the object 110 based on input data from the inspection system 104. Based on the time-stamped location of the inspection system 104 or vehicle 102 when an image captured by the inspection image reveals a defect, the processor 108 can determine a location of the defect on the object relative to the 3D model and/or the 3D map.

Still referring to FIG. 1, according to some non-limiting aspects, the computing system 106 can further include a user interface 116 configured to illustrate the determined location of the detected defect(s) of the object 110 and/or image data collected by the inspection sensor 104. The user interface 116 can be on-board or off-board (remote from) the vehicle 102. The user interface 116 can be communicably coupled to the computing system 106 via the data link 99, can include a display, and can be implemented with a separate computer and/or a mobile device.

Figure 2:
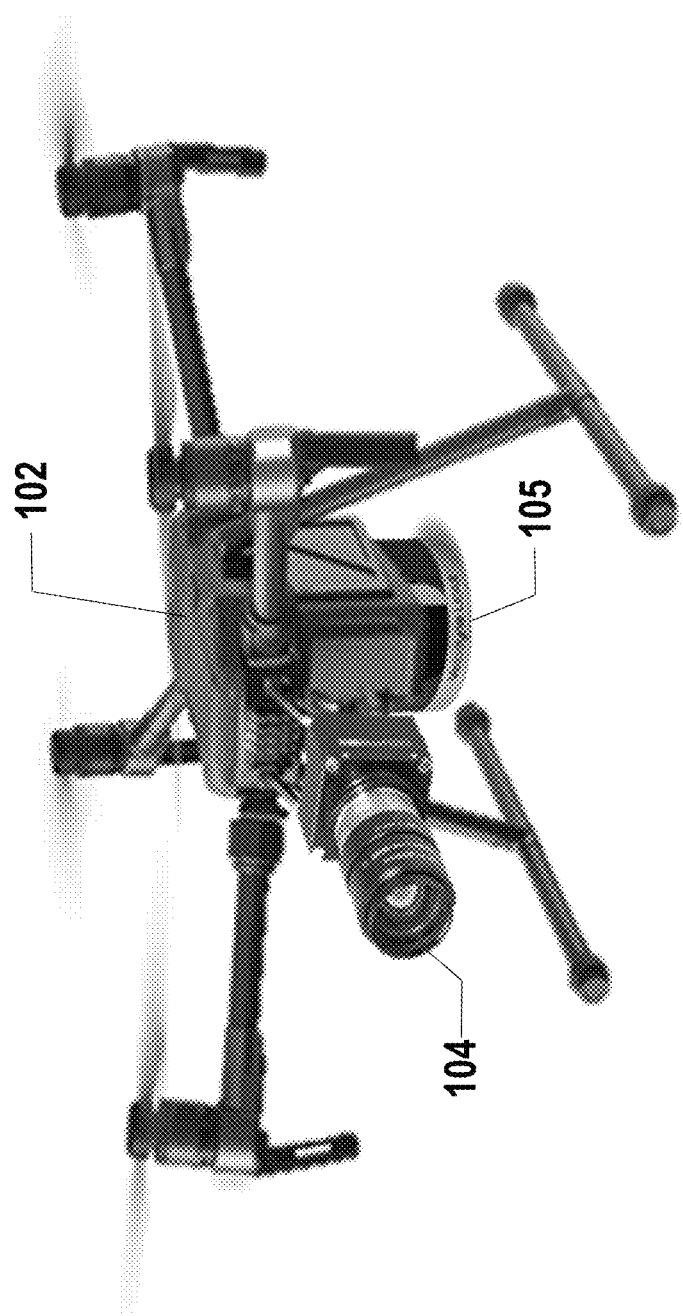
FIG. 2 illustrates a vehicle of the system of FIG. 1 in accordance with at least one non-limiting aspect of the present disclosure.

FIG. 2, depicts the vehicle 102 of FIG. 1 in accordance with at least one non-limiting aspect. According to the non-limiting aspect of FIG. 2, the inspection vehicle 102 can be an autonomous drone, or unmanned aerial vehicle (UAV), configured to travel by air. The vehicle 102 can include the inspection sensor 104 configured to perform the inspection of the object 110 (e.g., a camera to capture images of the object 110).

In further reference to FIG. 2, the vehicle 102 can further include the 3D mapping sensor 105, which can be a lidar or laser scanner. For example, the lidar sensing system 105 senses objects (e.g., surfaces of the object 110) in the vicinity of the vehicle 102 by measuring the distances from the 3D mapping sensor 105 (and hence the vehicle 102) to the objects by illuminating the surfaces/objects with laser light. In one aspect, the lidar laser system can include several channels (e.g., 16 or 32 laser beams) that scan a 360° horizontal field of view, with about a 30° to 40° vertical field of view, that scans 5 to 20 times per second (for example), thereby collecting hundreds of thousands (e.g., 300,000) lidar data points per second, with a measurement range of about 100 meters and an accuracy of about 2 cm or less. The lidar sensing system 105 can be implemented with a Velodyne® HDL-32E model lidar sensor, for example, or any other suitable lidar scanner, assuming it has a suitable range, bandwidth, and/or field of view for the intended application.

Figure 3A:
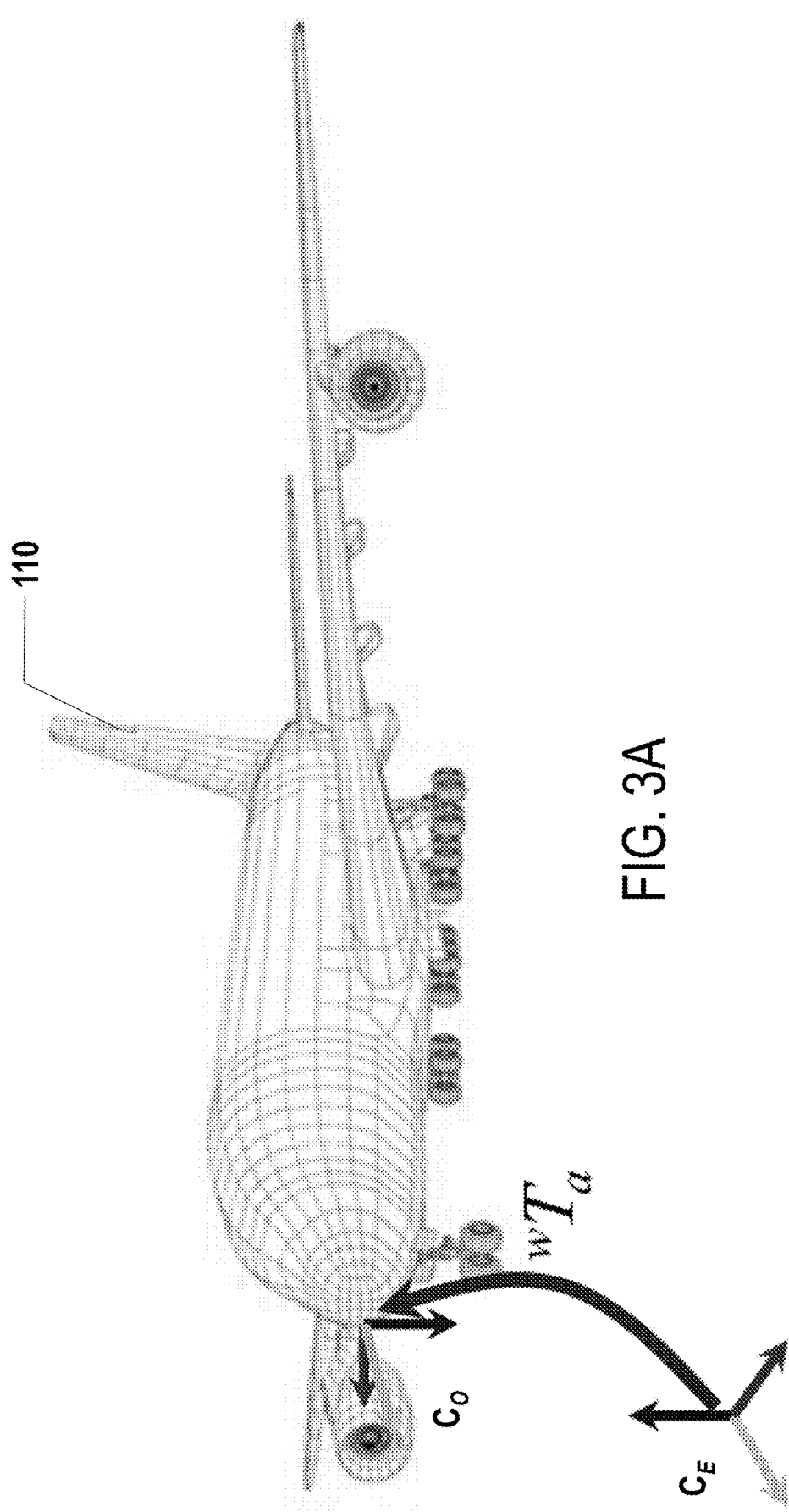
FIGS. 3A-3D illustrate a model generated by the system of FIG. 1 in accordance with at least one non-limiting aspect of the present disclosure.
Figure 3B:
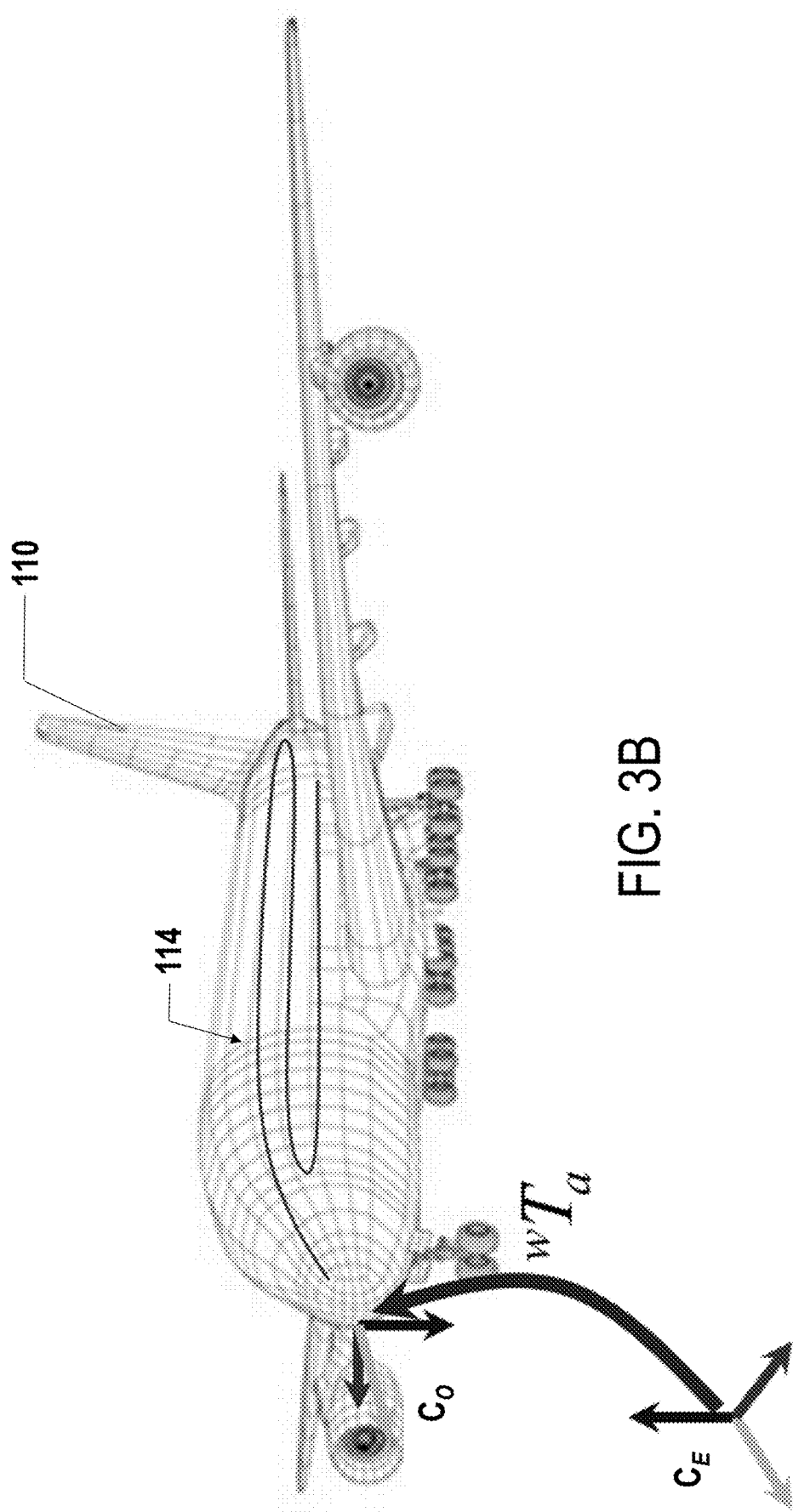

FIGS. 3A-3D illustrate how the inspection of the object 110 may be carried out according to several non-limiting aspects of the present disclosure. According to the aspects of FIGS. 3A-3D, the object 110 can be an aircraft. As shown in FIG. 3A, the 3D map of the object (e.g., the point cloud of object 110) can be expressed in terms of a global 3D coordinate system Cw. For example, the 3D mapping system chooses the origin of the global 3D coordinate system Cw, and generates a coherent point cloud descriptive of the shape of the object 110. The alignment of the 3D (CAD) model to the 3D map, performed by the processor, discovered a rigid six degrees of freedom (6DOF) transform $^{W}T_{A}$, by which the 3D CAD model reference frame Co is placed within coordinates in the CE coordinate system. FIG. 3B illustrates how an example travel path 114 that is originally defined in the 3D CAD coordinate system is aligned with the real 3D map of the object 110 after applying the 6DOF transform $^{W}T_{A}$. According to the non-limiting aspect of FIG. 3B, the vehicle 102 can fly back and forth along the fuselage at different height levels, or any arbitrary flight path predefined in the memory 109 according to the need of a particular inspection task.

Figure 3C:
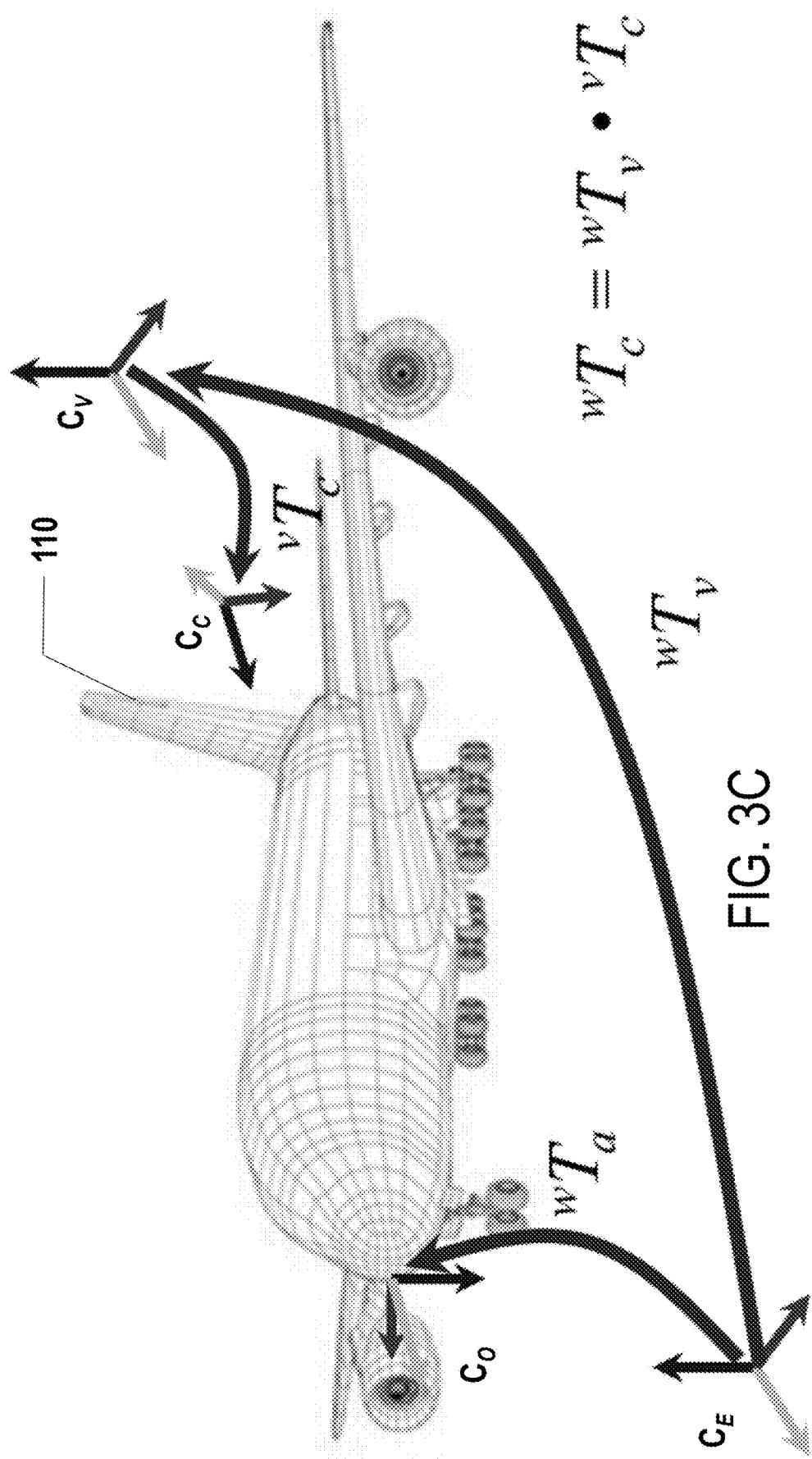

As mentioned herein, the inspection instructions stored in the memory 109 can include instructions to capture images of specific locations on the object 110, at certain distances from the object 110, and at certain angles relative to the object 110. For example, FIG. 5 illustrates one such location, distance, and angle that can be included in the inspection instructions. The inspection vehicle 102 motion controller in combination with information from the localization subsystem positions the vehicle 102 and the inspection sensor 104 in the correct location and with the correct orientation relative the object 110 to capture the images required by the inspection instructions. FIG. 3C shows the localization system reporting 6DOF transform $^{W}Tv$, the pose of the vehicle's 102 reference frame Cv in the global reference frame Cw. The pose tracking system of the inspection sensor 104 determines 6DOF transform $^{V}Tc$, the pose of the inspection senor's 104 reference frame Cc in the vehicle's reference frame Cv.

Figure 3D:
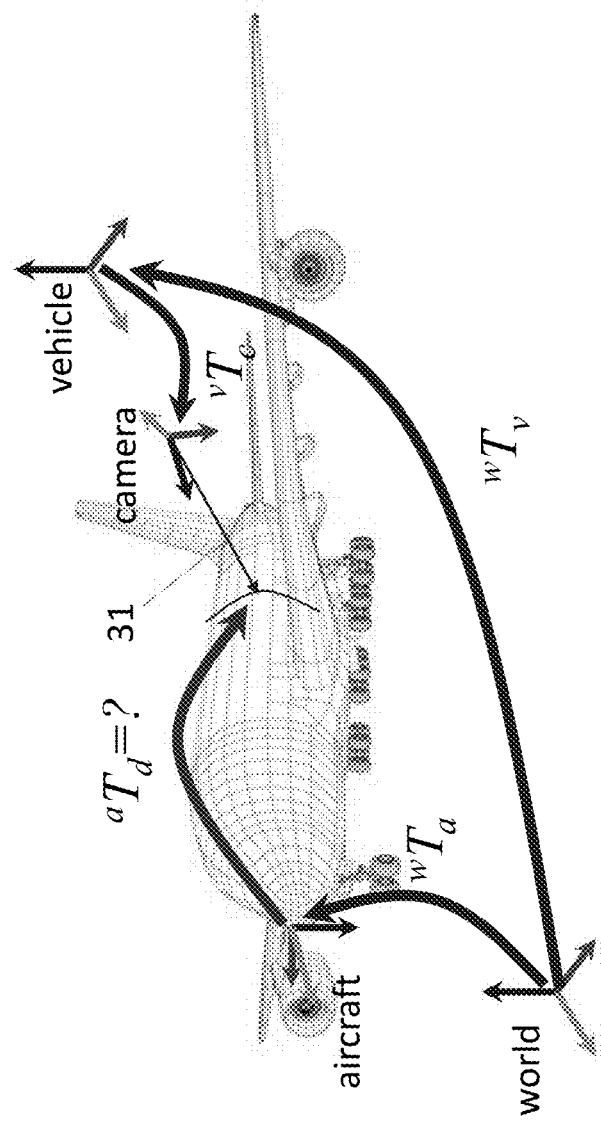

FIG. 3D shows a particular sensing ray 31 of the inspection sensor 104 (e.g., camera) whose direction is known in the reference frame Cc by the virtue of the inspection sensor 104 construction and calibration. For example, when the inspection sensor is a camera, the inspection ray 31 can be thought of as a viewing ray of one pixel from the image sensor. This pixel may be where a defect is discovered via image analysis. It is of interest to determine a location where this defect is on the object 110. FIG. 3D shows how this location can be found. The location of the intersection of the sensing ray 31 with the surface of the object 110 can be determined by compounding all the known rigid transforms (and their inverses where appropriate) $^{W}T_{A}$, $^{W}Tv$, $^{V}Tc$, and the direction of the sensing ray 31. For those skilled in art the compounding of these transforms is trivial yielding the location of the defect within the 3D CAD model of the aircraft. This location directly guides a maintenance personnel to the location of the defect on the aircraft, or this location is logged into the maintenance system.

Figure 4:
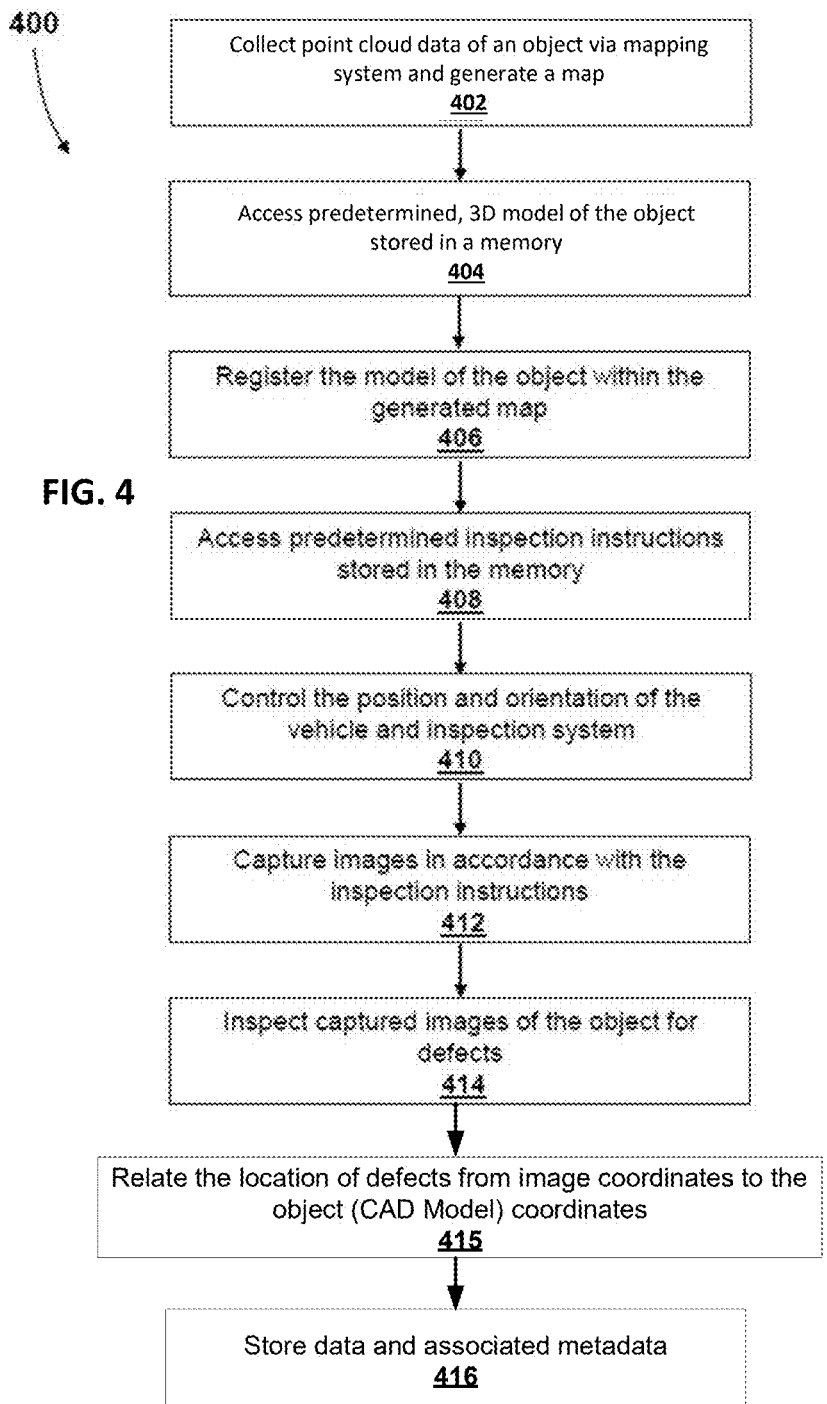
FIG. 4 illustrates a method of autonomously inspecting an object in accordance with at least one non-limiting aspect of the present disclosure.

Referring now to FIG. 4, a method 400 of autonomously inspecting the object 110 with the vehicle 102 is depicted in accordance with at least one non-limiting aspect of the present disclosure. According to the non-limiting aspect of FIG. 4, the method 400 can include, at step 402, collecting 3D point cloud data of the object 110 with the 3D mapping system 105 of the vehicle 102 and generating the 3D map (e.g., point cloud) of the object from the point cloud data. As previously discussed, the collection of the 3D point cloud data can be performed during an initial journey of the vehicle 102 through an environment within which the object 110 is positioned. The initial journey can be considered a first (or initial) movement stage (or phase) of the vehicle around the object. The vehicle may move around the vehicle one or more times in the first movement stage/phase. In the case of an aerial inspection vehicle 102, the vehicle 102 could land one or more times during the course of the first movement stage/phase. The lidar point cloud data can be time-stamped and the 3D location of the vehicle is known continuously as the point cloud data are captured. Thus, the lidar point cloud for the object 110 can be registered to a 3D global coordinate system (e.g., CE in FIGS. 3A-3C). The method can further include, at step 404, accessing a 3D model (e.g., a CAD model) of the object 110 stored in the memory 109 of the computing system 106, of the vehicle 102.

According to the method 400 of FIG. 4, at step 406, the computing system 106 registers the 3D model of the object to the 3D map generated at step 404. At step 408, predetermined inspection instructions stored in the memory 10 of the computing system 106 can then be accessed. At step 410, the processor 108 can control the position and orientation of the vehicle 102, and correspondingly the position and orientation of the inspection system 104 on the vehicle 102, as the vehicle 102 moves around the object 110 for the inspection so that, at step 412, the inspection system 104 can capture the images of the object 110 in accordance with the inspection instructions. The movement of the vehicle 102 around the object 110 at step 410 can be considered a second movement stage (or phase) of the vehicle that follows in time the first movement stage/phase. At step 414, the computing system 106 can inspect the images captured by the inspection system 104 to detect defects (or lack of defects) in the captured images of the object 110. At step 415 the computing system 106 relates the image coordinates of the detected defects to the 3D coordinates on the object 110 CAD model where the detected defect is. At step 416 the inspection data and metadata related to detected defects and their coordinates are stored in a database for further use, historical record, and maintenance.

In various aspects, the vehicle 102 may land after step 402 and before step 410 (e.g., between in time the first and second movement stages of the vehicle) so that the batteries of the vehicle 102 can be conserved and/or recharged. Then the vehicle 102 can take off again to inspect the vehicle at steps 410 and 412. In other aspects, steps 402 to 412 could be completed in one flight by the vehicle 102. The defect detection at step 414 could be performed by an on- or off-board computer of the computing system 106. When an off-board computer performs the defect detection, the images captured by the inspection system 104 can be uploaded to the off-board computer system after steps 410, 412, or, in other aspects, could be transmitted during the flight to the off-board computer for inspection. Also, the registering/aligning of the 3D model to the 3D map at step 404 could be performed by an on- or off-board computer of the computer system 106. When the registration/alignment is performed off-line, the results can be uploaded to the vehicle 102 so that the vehicle's processor 108 can control the flight path of the vehicle for the inspection.

The processor 108 can also include a controller for controlling the steering, propulsion and/or braking systems of the vehicle 102 based on navigation control commands generated by the processor 108. The processor 108, whether on-board the vehicle 102, off-board the vehicle 102, or distributed between the vehicle 102 and a remote computer system, may include one or more processors (e.g., CPUs or GPUs), primary data storage or memory (i.e., memory that is directly accessible to the CPUs/GPUs, such as RAM, ROM, registers, cache memory), and secondary data storage (i.e., data storage that is not directly accessible by the CPUs/GPUs, such as HDDs, flash, SSDs, etc.). The computer system may also include nearline and/or off-line storage. The processor(s) 108 and the computer system may be programmed to perform the functions described herein with software that is stored in the primary, secondary, nearline and/or off-line data storage, as the case may be, and executed by the processor(s) 108. The computer software may be implemented using any suitable computer programming language such as NET, C, C++, JavaScript, Python, Ruby, Lua, and Perl, and using conventional, functional, or object-oriented techniques. Programming languages for computer software and other computer-implemented instructions may be translated into machine language by a compiler or an assembler before execution and/or may be translated directly at run time by an interpreter.

In one general aspect, therefore, embodiments of the present invention are directed to systems and methods for inspecting an object, such as for defects in the object. The system, in various embodiments, comprises a vehicle for moving around the object to inspect the object, where the vehicle comprises: a 3D mapping sensor system for collecting time-stamped first data of an environment around the vehicle as the vehicle moves around the object; a localization sensor system for collecting time-stamped second data indicative of position and attitude of the vehicle as the vehicle moves around the object; and an inspection sensor system for colleting time-stamped third data descriptive of the object as the vehicle moves around the object, where the third data are for detecting a possible defect with the object. The system also comprises a computer system that comprises: a memory for storing a predetermined 3D model of the object; and a processor programmed to operate vehicle motion in two stages around the object. The two stages comprise a first motion stage and a second stage, the second stage being subsequent to the first stage. From the first motion stage of the vehicle around the object, the computer system is configured to: generate a 3D map of the environment based on the first data collected by the 3D mapping sensor system of the vehicle and the second data collected by the localization sensor system of the vehicle; and register the predetermined 3D model of the object within the 3D map, thereby generating a registration identifying where the predetermined 3D model is located within the 3D map.

From the second motion stage of the vehicle around the object, the computer system is configured to: control the position and orientation of the vehicle as the vehicle moves around the object based on, at least, predetermined inspection instructions for the vehicle, where the predetermined inspection instructions are stored in the memory; and inspect the third data collected by the inspection sensor system to identify one of more defects in the object. For each of the one or more defects identified in the object, the computer system is configured to relate a location of the defect on the object from coordinates for the defect from the third data to coordinates of the predetermined 3D model of the object based on the registration of the predetermined 3D model of the object with the 3D map.

A method for inspecting an object can comprise the step of operating a vehicle motion in two stages around the object, the two stages comprising a first motion stage and a second stage, the second stage being subsequent to the first stage. In the first motion stage of a vehicle around the object, the method comprises: collecting, by a 3D mapping sensor system of the vehicle, time-stamped first data of an environment around the vehicle as the vehicle moves around the object; collecting, by a localization sensor system of the vehicle, collecting time-stamped second data indicative of a position and attitude of the vehicle as the vehicle moves around the vehicle; generating, by a computer system, a 3D map of the environment based on the first data collected by the 3D mapping sensor system of the vehicle and the second data collected by the localization sensor system of the vehicle; and generating, by the computer system, a registration of a predetermined 3D model of the object with the 3D map, where the predetermined 3D model of the object is stored in a memory of the computer system;

In the second motion stage of the vehicle around the object, the method comprises the steps of: collecting, by an inspection sensor system of the vehicle, time-stamped third data of the object as the vehicle moves around the object, where collecting the third data comprises controlling position and orientation of the vehicle for the second motion stage of the vehicle according to predetermined inspection instructions for the vehicle, wherein the predetermined inspection instructions are stored in the memory of the computer system; and inspecting, by the computer system, the third data collected by the inspection sensor system to identify one of more defects in the object. For each of the one or more defects identified in the object, the method comprises the steps of: relating, by the computer system, a location of the defect on the object from coordinates for the defect from the third data to coordinates of the predetermined 3D model of the object based on the registration of the predetermined 3D model of the object within the 3D map.

In various implementations, the vehicle comprises an autonomous aerial vehicle, such as a drone. The object being inspected may be an airplane. The inspection sensor system may comprise a camera such that the third data comprises image data. The 3D mapping sensor system may comprise a lidar sensor. The localization sensor system may comprise at least one of an inertial measurement unit, a laser range finder, a camera, and a GPS receiver. The predetermined 3D model of the object may comprises a CAD model of the object. The 3D map may comprise a point cloud of a scene in which the inspection system operates. The computer system may be programmed to register the predetermined 3D model to the 3D map by registering one or more distinctive 3D features of the predetermined 3D model of the object to corresponding distinctive 3D features in the 3D map.

In various implementations, the computer system is programmed to register the predetermined 3D model to the 3D map by adjusting an alignment between the predetermined 3D model and the 3D map by minimizing a distance between the one or more distinctive features of the predetermined 3D model of the object to the corresponding distinctive features in the 3D map.

The computer system may be on-board the vehicle or it could be off-board the vehicle, in which case the vehicle can communicate with the computer system via a wireless data link.

In various implementations, the computer system is programmed to examine the third data collected by the inspection sensor system to identify one of more defects in the object using a machine learning algorithm that is trained to detect defects in the object. Also, the possible defect can comprises a possible flaw in the object, a possible anomaly in the object, and/or a possible exception in the object (e.g., something out of nominal).

The vehicles, systems and methods disclosed herein shall not be limited to the above-described configurations. Rather, the specific configurations described and depicted herein are exclusively presented for illustrative purposes. It shall be appreciated that any of the features described herein can be reallocated based on user preference and/or intended application. For example, although some non-limiting aspects may describe a vehicle with an on-board computing system, it shall be appreciated that, according to other non-limiting aspects, the computing system—or any of its components—can be consolidated, partitioned, repositioned, and/or reconfigured to achieve the same functional effect. For example, according to other non-limiting aspects, the computing system—or any of its components—can be remotely located relative to the vehicle. In short, the vehicles, systems, and methods disclosed herein shall not be limited to any particular system architecture.

The aspects presented herein are intended to illustrate potential and specific implementations of the present disclosure. It can be appreciated that the examples are intended primarily for purposes of illustration of the invention for those skilled in the art. No particular aspect or aspects of the examples are necessarily intended to limit the scope of the present disclosure. Further, it is to be understood that the figures and descriptions of the present disclosure have been simplified to illustrate elements that are relevant for a clear understanding of the present disclosure, while eliminating, for purposes of clarity, other elements. While various aspects have been described herein, it should be apparent that various modifications, alterations, and adaptations to those aspects may occur to persons skilled in the art with attainment of at least some of the advantages. The disclosed aspects are therefore intended to include all such modifications, alterations, and adaptations without departing from the scope of the aspects as set forth herein.

What is claimed is:

1. A system for inspecting an object, the system comprising:
   a vehicle for moving around the object to inspect the object, the vehicle comprising:
      a 3D mapping sensor system for collecting time-stamped first data of an environment around the vehicle as the vehicle moves around the object;
      a localization sensor system for collecting time-stamped second data indicative of position and attitude of the vehicle as the vehicle moves around the object; and
      an inspection sensor system for collecting time-stamped third data descriptive of the object as the vehicle moves around the object, wherein the third data are for detecting a possible defect with the object; and
   a computer system, wherein the computer system:
      comprises a memory for storing a predetermined 3D model of the object; and
      a processor programmed to operate vehicle motion of the vehicle in two stages around the object, wherein the two stages comprise a first motion stage and a second stage, the second stage being subsequent to the first stage, wherein:
         from the first motion stage of the vehicle around the object, the processor is configured to:
            generate a 3D map of the environment based on the first data collected by the 3D mapping sensor system of the vehicle and the second data collected by the localization sensor system of the vehicle; and
            register the predetermined 3D model of the object within the 3D map, thereby generating a registration identifying where the predetermined 3D model is located within the 3D map; and
         from the second motion stage of the vehicle around the object, the processor is configured to:
            control position and orientation of the vehicle as the vehicle moves around the object based on, at least, predetermined inspection instructions for the vehicle, wherein the predetermined inspection instructions are stored in the memory;
            inspect the third data collected by the inspection sensor system to identify one of more defects in the object; and
            for each of the one or more defects identified in the object, relate a location of the defect on the object from coordinates for the defect from the third data to coordinates of the predetermined 3D model of the object based on the registration of the predetermined 3D model of the object with the 3D map.

2. The system of claim 1, wherein the vehicle comprises an autonomous aerial vehicle.

3. The system of claim 2, wherein the autonomous aerial vehicle comprises a drone.

4. The system of claim 3, wherein the object comprises an airplane.

5. The system of claim 1, wherein the inspection sensor system comprises a camera and wherein the third data comprises image data.

6. The system of claim 1, wherein the 3D mapping sensor system comprises a lidar sensor.

7. The system of claim 6, wherein the inspection sensor system comprises a camera and wherein the third data comprises image data.

8. The system of claim 7, wherein the localization sensor system comprises at least one of an inertial measurement unit, a laser range finder, a camera, and a GPS receiver.

9. The system of claim 8, wherein the predetermined 3D model of the object comprises a CAD model of the object.

10. The system of claim 9, wherein the 3D map comprises a point cloud of a scene in which the inspection system operates.

11. The system of claim 1, wherein the computer system is programmed to register the predetermined 3D model to the 3D map by registering one or more distinctive 3D features of the predetermined 3D model of the object to corresponding distinctive 3D features in the 3D map.

12. The system of claim 11, wherein the computer system is programmed to register the predetermined 3D model to the 3D map by adjusting an alignment between the predetermined 3D model and the 3D map by minimizing a distance between the one or more distinctive features of the predetermined 3D model of the object to the corresponding distinctive features in the 3D map.

13. The system of claim 1, wherein the computer system is on-board the vehicle.

14. The system of claim 1, wherein:
   the computer system is off-board the vehicle; and
   the vehicle communicates with the computer system via a wireless data link.

15. The system of claim 1, wherein the computer system is programmed to examine the third data collected by the inspection sensor system to identify one of more defects in the object using a machine learning algorithm that is trained to detect defects in the object.

16. The system of claim 1, wherein:
   the vehicle comprises an autonomous aerial vehicle;
   the inspection sensor system comprises a camera and wherein the third data comprises image data;
   the 3D mapping sensor system comprises a lidar sensor;
   the localization sensor system comprises at least one of an inertial measurement unit, a laser range finder, a camera and a GPS receiver;
   the predetermined 3D model of the object comprises a CAD model of the object;
   the 3D map comprises a point cloud; and
   the computer system is programmed to generate the registration by, for each of one or more distinctive features of the predetermined 3D model of the object, mapping the distinctive feature to a corresponding geometric feature of 3D map by minimizing an alignment of the one or more distinctive features of the predetermined 3D model of the object to the corresponding geometric features of 3D map.

17. The system of claim 16, wherein the computer system is on-board the vehicle.

18. The system of claim 1, wherein each of the one or more defects identified in the object comprises a defect selected from the group consisting of a flaw in the object, an anomaly in the object, and an exception in the object.

19. A method for inspecting an object, the method comprising:
- operating a vehicle motion in two stages around the object, the two stages comprising a first motion stage and a second stage, the second stage being subsequent to the first stage;
- in the first motion stage of a vehicle around the object:
  - collecting, by a 3D mapping sensor system of the vehicle, time-stamped first data of an environment around the vehicle as the vehicle moves around the object; and
  - collecting, by a localization sensor system of the vehicle, collecting time-stamped second data indicative of a position and attitude of the vehicle as the vehicle moves around the vehicle;
- generating, by a computer system, a 3D map of the environment based on the first data collected by the 3D mapping sensor system of the vehicle and the second data collected by the localization sensor system of the vehicle;
- A generating, by the computer system, a registration of a predetermined 3D model of the object located within the 3D map, wherein the predetermined 3D model of the object is stored in a memory of the computer system;
- in the second motion stage of the vehicle around the object, collecting, by an inspection sensor system of the vehicle, time-stamped third data of the object as the vehicle moves around the object, wherein collecting the third data comprises controlling position and orientation of the vehicle for the second motion stage of the vehicle according to predetermined inspection instructions for the vehicle, wherein the predetermined inspection instructions are stored in the memory of the computer system;
- inspecting, by the computer system, the third data collected by the inspection sensor system to identify one of more defects in the object; and
- for each of the one or more defects identified in the object, relating, by the computer system, a location of the defect on the object from coordinates for the defect from the third data to coordinates of the predetermined 3D model of the object based on the registration of the predetermined 3D model of the object within the 3D map.

20. The method of claim 19, wherein:
the vehicle comprises an autonomous aerial vehicle;
the inspection sensor system comprises a camera wherein the third data comprises image data;
the 3D mapping sensor system comprises a lidar sensor;
the localization sensor system comprises at least one of an inertial measurement unit, a lidar, a camera, and a GPS receiver;
the predetermined 3D model of the object comprises a CAD model of the object;
the 3D map comprises a point cloud of a scene in which the inspection system operates; and
registering each of one or more distinctive features of the predetermined 3D model of the object, to the distinctive feature to one or more corresponding geometric features in the 3D map by minimizing an alignment error of the one or more distinctive features of the predetermined 3D model of the object to the corresponding geometric features of 3D map.

21. The method of claim 19, wherein the computer system is on-board the vehicle.

22. The method of claim 19, further comprising recharging a rechargeable battery of the vehicle between the first and second motion stages of the vehicle.

23. The method of claim 19, wherein:
the vehicle comprises an aerial vehicle; and
the method comprises completing the first and second motion stages of the aerial vehicle without landing the aerial vehicle until the second motion stage is completed.

* * * * *